(12) United States Patent
Inamoto

(10) Patent No.: US 6,859,274 B2
(45) Date of Patent: Feb. 22, 2005

(54) LIGHT SPECTRUM DETECTING APPARATUS

(75) Inventor: Naoki Inamoto, Kikuchi-gun (JP)

(73) Assignee: Otsuka Electronics Co., Ltd., Hirakata (JP)

(*) Notice: Subject to any disclaimer, the term of this patent is extended or adjusted under 35 U.S.C. 154(b) by 81 days.

(21) Appl. No.: 10/333,991

(22) PCT Filed: Jul. 5, 2001

(86) PCT No.: PCT/JP01/05830
§ 371 (c)(1),
(2), (4) Date: Jan. 27, 2003

(87) PCT Pub. No.: WO02/10698
PCT Pub. Date: Feb. 7, 2002

(65) Prior Publication Data
US 2003/0117621 A1 Jun. 26, 2003

(30) Foreign Application Priority Data
Jul. 28, 2000 (JP) ........................ 2000-229517

(51) Int. Cl.[7] .................................................. G01J 3/28
(52) U.S. Cl. ................................. 356/326; 250/559.11
(58) Field of Search ................................. 356/326, 328, 356/213, 217, 218; 362/311; 250/559.11, 216

(56) References Cited

U.S. PATENT DOCUMENTS

| 4,054,389 A | * 10/1977 | Owen ........................ 356/419 |
| 4,222,667 A | * 9/1980 | Layne ........................ 356/454 |
| 4,633,078 A | 12/1986 | Ferber |
| 5,543,612 A | * 8/1996 | Kanaya et al. ........... 250/208.1 |
| 5,721,614 A | 2/1998 | Cerutti-Maori et al. |

FOREIGN PATENT DOCUMENTS

| DE | 3941653 A1 | * 6/1991 |
| EP | 0 244 092 | 11/1987 |
| GB | 472448 | 9/1937 |

OTHER PUBLICATIONS

Ichikawa Susumu, "Spectroscopic Device", Patent Abstracts of Japan Publication No. 09250946, (Sep. 22, 1997).

* cited by examiner

Primary Examiner—Frank G. Font
Assistant Examiner—Layla Lauchman
(74) Attorney, Agent, or Firm—Finnegan, Henderson, Farabow, Garrett & Dunner, L.L.P.

(57) ABSTRACT

A light spectrum detecting apparatus according to the present invention comprises a photodetector (13) and a light transmitting plate (13b) covering a light receiving surface (13a) of the photodetector (13), and in the apparatus, a front surface S of the light transmitting plate 13b is inclined and, among incidents lights, any light once reflected by a back surface T of the light transmitting plate (13b) travels thereafter, with being totally reflected by the front surface S and the back surface T of the light transmitting plate (13b), to a side surface 13d of the light transmitting plate (13b). Any stray light can be prevented from entering the photodetector (13).

2 Claims, 2 Drawing Sheets

Prior Art

LIGHT SPECTRUM DETECTING APPARATUS

FIELD OF THE INVENTION

The present invention relates to a light spectrum detecting apparatus for detecting a light spectrum including multi-wavelengths.

BACKGROUND ART

As a photodetector for a light spectrum detecting apparatus, a one- or two-dimensional photodetector utilizing a photodiode array or a CCD is used. Such a photodetector is put in a protective casing 24 so that a light receiving surface 23 can be protected from humidity or the like, as shown in FIG. 3. And a light transmitting plate 22 is provided in front of the light receiving surface 23 to seal an inert gas in the protective casing 24.

However, in some cases, a light incident to the light transmitting plate 22 is reflected by a back surface of the light transmitting plate 22 to return to a front surface thereof, and it is reflected again by the front surface and then incident on the light receiving surface 23 (such rays are shown with designation R in FIG. 3).

Such a multiply reflected light is a stray light, which causes to generate unnecessary signals when it enters the photodetector. As a result, the spectrum detection accuracy is lowered.

Further, it is difficult to remove such a stray light, because it is just adjacent to a light to be properly detected.

DISCLOSURE OF THE INVENTION

An object of the present invention is to realize a light spectrum detecting apparatus capable of preventing lowering of the spectrum detection accuracy by hindering any light multiply reflected in a light transmitting plate from reaching a light receiving surface.

In a light spectrum detecting apparatus according to the present invention, a front surface of a light transmitting plate covering a light receiving surface is inclined, so that, among lights incident to the light transmitting plate, any light once reflected by the back surface of the light transmitting plate is reflected again by the front surface thereof and then, with being totally reflected by the back surface of the light transmitting plate, reaches a side surface of the light transmitting plate.

With this structure, among lights incident to the light transmitting plate, any light once reflected by the back surface of the light transmitting plate does not go out of the back surface and is not detected by the photodetector. Consequently, no stray light enters the photodetector and the spectrum detection accuracy is not lowered.

The abovementioned condition "any light once reflected by the back surface of the light transmitting plate does not go out of the back surface of the light transmitting plate" is represented by the following formula.

Assuming that the angle between the front surface and the back surface of the light transmitting plate is $\alpha$; the incident angle of the incident light on the front surface of the light transmitting plate is $\beta$; the refractive index of the light transmitting plate is n1; and the critical angle is $\theta$, $$\alpha + \sin^{-1}(\sin \beta/n1) < \theta \leq 3\alpha + \sin^{-1}(\sin \beta/n1)$$

Now, embodiments of the present invention will be described in the following with reference to the appended drawings.

DETAILED DESCRIPTION OF THE PREFERRED EMBODIMENTS

Figure 1:
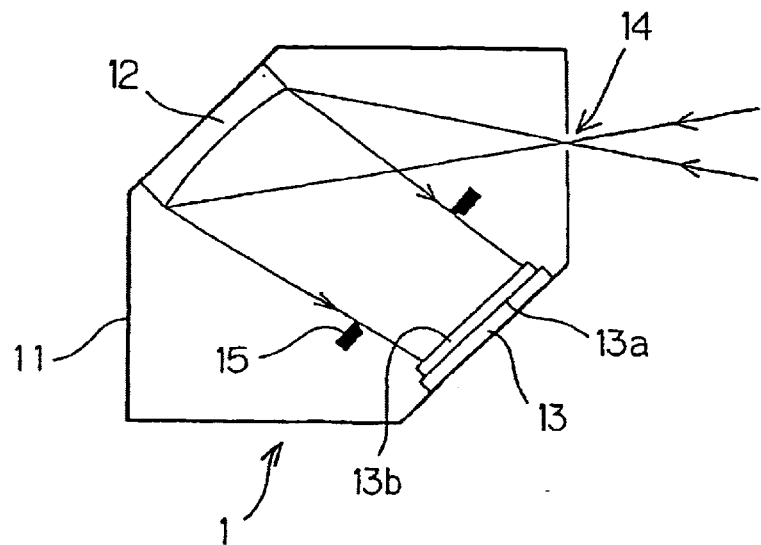
FIG. 1 is an inner structural view of a light spectrum measuring apparatus.

FIG. 1 is a plan view of a light spectrum measuring apparatus 1. The light spectrum measuring apparatus 1 comprises a box-shaped housing 11 having black inside surfaces, and a concave diffraction grating 12 and a CCD (Charge Coupled Device) photodetector 13 provided in the box-shaped housing 11. A light receiving surface 13a of the CCD photodetector 13 is covered with a rectangular light transmitting plate 13b. Further, in the wall of the box-shaped housing 11, provided is a circular aperture slit 14 for introducing a light, the spectrum of which is to be measured. Numeral 15 indicates a light shielding plate for limiting a light incident on the CCC photodetector 13.

The photodetector 13 is not limited to a CCD photodetector but may be, for example, one utilizing a photodiode array (PDA).

Figure 2:
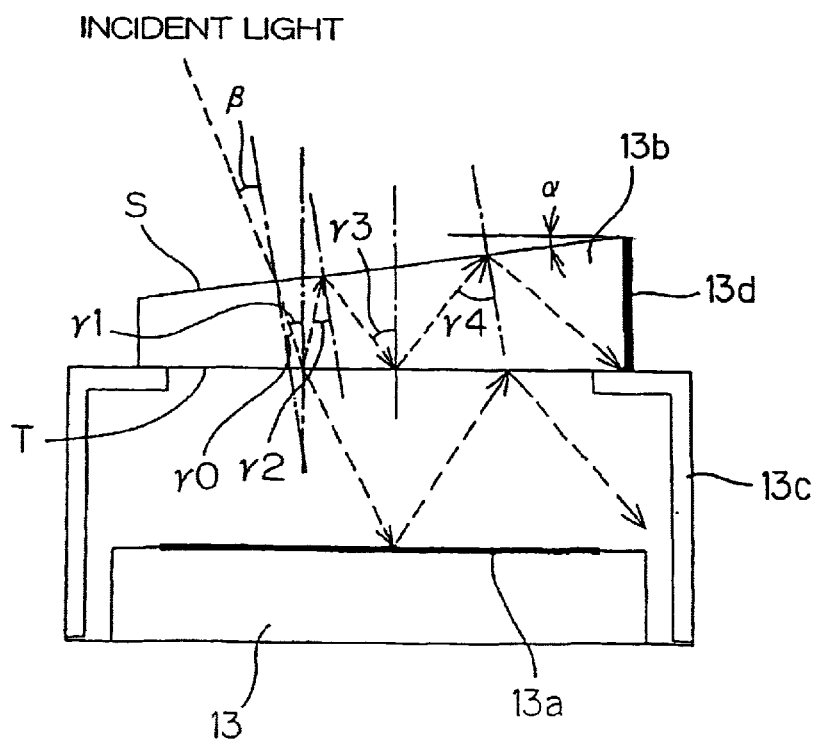
FIG. 2 is a side sectional view showing a CCD photodetector 13 put in a protective casing.
Figure 3:
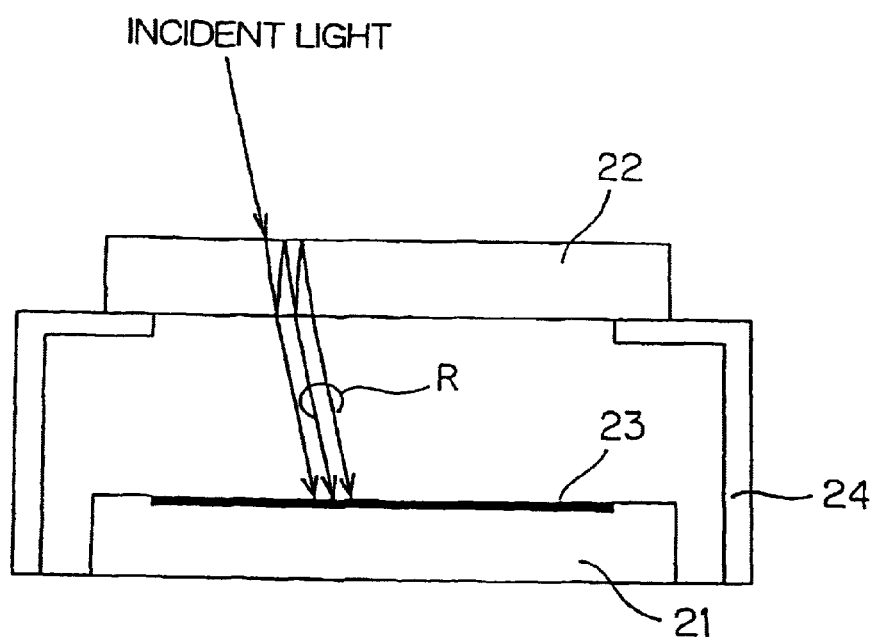
FIG. 3 is a side sectional view of a conventional photodetector.

FIG. 2 is a side sectional view of the CCD photodetector 13. The CCD photodetector 13 is contained in a protective casing 13c opened at the front part thereof. And the opened surface of the protective casing 13 is air-tightly covered with the light transmitting plate 13b made of multi-component glass, quartz glass, sapphire or the like. The right side surface of the light transmitting plate is treated to become a nonreflective section 13d.

As shown in FIG. 2, the front surface S of the light transmitting plate 13b is obliquely cut. The incident light is incident with its light axis inclined by an angle ($\beta$) with respect to the normal of the cut surface S.

Generally, when a light is incident on an interface from a medium having a high refractive index (refractive index n1) toward another medium having a low refractive index (refractive index n2) with more than a certain incident angle, the light is totally reflected. This condition is represented by the following formula.

$$\sin \theta = n2/n1 \text{ (} \theta \text{ being the critical angle)}$$

For example, when the medium having a high refractive index is sapphire (n1=1.8) and the medium having a low refractive index is air (n2=1), the critical angle $\theta$ is 33.7°.

The transmission light entering the light transmitting plate 13b is refracted with a refraction angle $\gamma 0$ and strikes against a back surface T of the light transmitting plate 13 with an incident angle $\gamma 1$.

n1 sin $\gamma 0$ = sin $\beta$ $\gamma 0 = \sin^{-1}(\sin \beta/n1)$ $\gamma 1 = \alpha + \gamma 0$ A part of the light is reflected by the back surface T of the light transmitting plate 13b and strikes against the cut surface S with an incident angle $\gamma 2$.

$\gamma 2 = 2\alpha + \gamma 0$

There, a part of the light is reflected by the cut surface S and strikes against the back surface T with an incident light angle $\gamma 3$.

$$\gamma 3=3\alpha+\gamma 0$$

There, the light is totally reflected and strikes against the cut surface S with an incident angle $\gamma 4$.

$$\gamma 4=4\alpha+\gamma 0$$

It is necessary that the abovementioned $\gamma 1$ is smaller than the critical angle $\theta$, and $\gamma 3$ is larger than the critical angle $\theta$. That is $\gamma 1 < \theta \leq \gamma 3$.

Here, samples of numerical values will be shown in the following. The inclination angle $\alpha$ of the cut surface S of the light transmitting plate 13b is set as $\alpha=10°$, and the incident light is further inclined by $\beta=10°$ with respect to the normal of the cut surface S. The following results are obtained by calculation.

$\gamma 1 = 15.5°$
$\gamma 2 = 25.5°$
$\gamma 3 = 35.5°$
$\gamma 4 = 46.5°$

Since the angle $\gamma 1$ is less than the critical angle 33.7° and the angle $\gamma 3$ is more than the critical angle 33.7°, the light is totally reflected and does not enter the photodetector 13. Accordingly, any stray light can be prevented from entering the CCD photodetector.

What is claimed is:

1. A light spectrum detecting apparatus comprising
   a photodetector and a light transmitting plate covering a light receiving surface of the photodetector,
   in which a front surface and a back surface of the light transmitting plate are set to be unparallel, and,
   among incident lights traveling toward the photodetector, any light passing the front surface of the light transmitting plate and reflected by the back surface thereof travels thereafter in the light transmitting plate, with being totally reflected by the front surface and the back surface thereof, toward a side surface of the light transmitting plate.

2. A light spectrum detecting apparatus as claimed in claim 1, in which, assuming that the angle between the front surface and the back surface of the light transmitting plate is $\alpha$; the incident angle of an incident light on the front surface of the light transmitting plate is $\beta$; the refractive index of the light transmitting plate is n1; and the critical angle is $\theta$, the following formula is satisfied, $$\alpha + \sin^{-1}(\sin \beta / n1) < \theta \leq 3$$

$$\alpha + \sin^{-1}(\sin \beta / n1).$$

* * * * *